United States Patent
Gerhardt et al.

(10) Patent No.: US 6,778,883 B1
(45) Date of Patent: *Aug. 17, 2004

(54) METHOD AND DEVICE FOR CONTROLLING THE DRIVE UNIT OF A VEHICLE

(75) Inventors: Juergen Gerhardt, Oberriexingen (DE); Bernhard Mencher, Schwieberdingen (DE); Werner Kind, Markgroeningen (DE); Werner Hess, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/168,245

(22) PCT Filed: Nov. 28, 2000

(86) PCT No.: PCT/DE00/04231

§ 371 (c)(1),
(2), (4) Date: Oct. 22, 2002

(87) PCT Pub. No.: WO01/44642

PCT Pub. Date: Jun. 21, 2001

(30) Foreign Application Priority Data

Dec. 18, 1999 (DE) .......................................... 199 61 291
Apr. 4, 2000 (DE) .......................................... 100 16 649

(51) Int. Cl.[7] ................................................. G08F 7/00
(52) U.S. Cl. .............................. 701/1; 701/53; 123/350
(58) Field of Search .............................. 701/1, 51, 53, 701/54, 58, 60, 22, 84, 87; 123/350

(56) References Cited

U.S. PATENT DOCUMENTS

| 5,491,635 A | | 2/1996 | Foeldi et al. |
| 6,125,314 A | * | 9/2000 | Graf et al. ..................... 701/53 |
| 6,164,901 A | * | 12/2000 | Blotenberg ..................... 415/1 |

FOREIGN PATENT DOCUMENTS

| DE | 196 11 502 | 9/1997 |
| DE | 197 09 317 | 9/1998 |
| DE | 197 39 567 | 3/1999 |
| GB | 2 321 535 | 7/1998 |

OTHER PUBLICATIONS

US patent application publication No. 2003/0098012 A1 (Ser. No. 10,149,956) Wild et al. May 29, 2003.*

* cited by examiner

Primary Examiner—Gertrude A. Jeanglaude
(74) Attorney, Agent, or Firm—Kenyon & Kenyon

(57) ABSTRACT

A method and a device for controlling the drive unit of a vehicle are provided, setpoint selection variables and characteristic variables being received, which represent the way the setpoint selection variable is set. In a coordinator, setpoint selection variables and characteristic variables are coordinated independently from one another and one of the variables is selected, on which the control of the drive unit is based. In a converter, the selected setpoint selection variable and characteristic variable are converted into control signals, the control signals being selected on the basis of the setpoint selection variable and the characteristic variable, optionally considering further operating variables, for example, the operating state of the drive unit.

9 Claims, 4 Drawing Sheets

METHOD AND DEVICE FOR CONTROLLING THE DRIVE UNIT OF A VEHICLE

FIELD OF THE INVENTION

The present invention relates to a method and a device for controlling a vehicle.

BACKGROUND INFORMATION

In modern vehicle control systems, multiple, and sometimes contradictory, selections may act on actuators (e.g., drive unit, transmission, etc.). Thus, for example, the drive unit of a motor vehicle may be controlled on the basis of a driving intent selected by the driver, and setpoints of external and/or internal regulation and control functions, such as a traction control, an engine anti-slip control, a transmission control, a speed limiter, and/or an idle speed regulator. These setpoint selections may have opposing effects, so that, since the drive unit may only achieve one of these setpoint selections, these setpoint selections must be coordinated, i.e., one setpoint selection to be implemented is to be selected.

A coordination of various torque setpoints in connection with the control system of a drive unit is referred to in German Published Patent Application No. 197 39 567, in which a setpoint is selected from the torque setpoints through maximum and/or minimum value selection, which is implemented in the instantaneous operating state by determining the variables of the individual control parameters of the drive unit, for example, in an internal combustion engine, the filling, the firing angle, and/or the quantity of fuel to be injected. In addition to the variables of the setpoint selections, various characteristics may be connected to the setpoint selections, for example, in relation to the required dynamic response of the adjustment, the priority, etc., which may also be of contradictory nature and which may not be considered in the coordination of the setpoint selections.

A procedure is referred to in German Published Patent Application No. 197 09 317, in which coordinators are selected for an entire vehicle. These coordinators perform the resource requirements and the resource distribution of the control systems of the entire vehicle on the basis of communicated boundary conditions, for example, a desired dynamic response. Concrete information concerning the procedure for controlling a drive unit may not be provided in consideration of the characteristics of the setpoint selections described above.

SUMMARY OF THE INVENTION

It is an object of an exemplary embodiment according to the present invention to provide measures that, in addition to the setpoint selection variables, aid in the coordination of the characteristic variables connected with them and/or consider the characteristic variables for control of the drive unit, upon conversion of the characteristic variables into control variables.

By coordinating the characteristic variables and the setpoint selection variables independently from one another, optimum coordination of opposing requirements in the control of the drive unit may result, and one suitable setpoint variable at a time, having a selected characteristic variable or selected characteristic variables, is converted into the corresponding control parameter of the drive unit, resulting in an implementation of the setpoint selections within the framework of boundary conditions communicated using the setpoint selections.

It is believed to be advantageous in that coordination of the variables occurs without concrete selection of the control parameters of the drive unit (for example, in an internal combustion engine, filling, firing angle, injection quantity, injection time, etc.) being performed at the time of the coordination of the setpoint selection variables and their characteristic variables.

It is believed that the procedure described above may advantageously coordinate and/or convert setpoint selection variables and characteristic variables in gasoline direct injection systems and in conventional intake manifold injection systems, diesel injection systems, or alternative drive systems (electric drives, fuel cell drives, etc.).

In a torque-oriented control system for the drive unit, external and internal torque requests, including their communicated boundary conditions, are coordinated and prioritized. It is believed that the procedure described above advantageously coordinates differing dynamic response requests, limits of the dynamic response conversion being considered by the coordinator. These coordinators may also be distributed over multiple control devices, independently of the partitioning.

The resulting setpoint determined by the coordinator, including the resulting characteristic variable(s), is converted by one or more setpoints for the control paths (control variables) of the drive unit as a function of the operating point and operating state of the drive unit. The communicated characteristic variable(s), the instantaneous operating state of the drive unit, and selection of the available control paths are considered during the conversion, so that optimum conversion of the resulting setpoint selections occurs in the framework of the resulting characteristic(s) and the present operating state of the engine.

DETAILED DESCRIPTION

Figure 1:
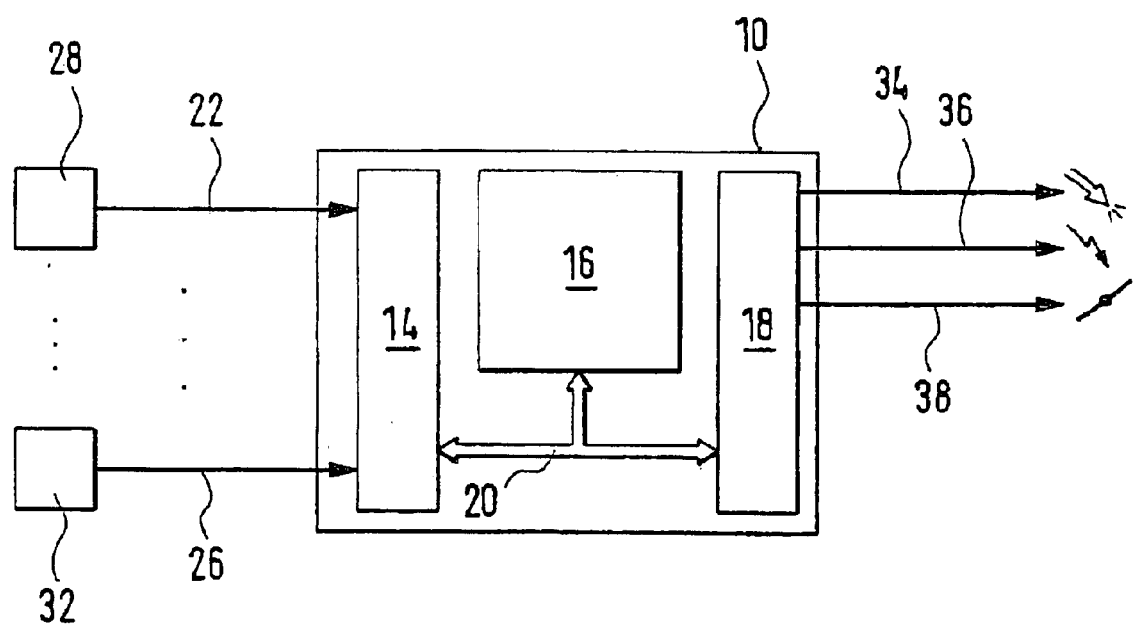
FIG. 1 is a block diagram of an exemplary control device for controlling a drive unit according to the present invention.

FIG. 1 is a block diagram of a control device for controlling a drive unit, for example, an internal combustion engine, which may include a gasoline direct injection. Control unit 10 includes an input circuit 14, at least one computer unit 16, and an output circuit 18. A communication system 20 connects these components for mutual data exchange. Input lines 22 to 26, which may include a bus system, are connected to input circuit 14 of control unit 10. Control unit 10 is provided with signals via lines 22 to 26, which represent operating characteristics to be analyzed for controlling the drive unit. These signals are detected by measuring devices 28 to 32. The operating characteristics may include accelerator pedal position, engine speed, engine load, exhaust composition, engine temperature, etc. Control unit 10 controls the output of the drive unit via output circuit 18, by output lines 34, 36, and 38, via which at least the fuel mass to be injected, the firing angle of the internal combustion engine, and at least one electrically actuatable throttle valve for adjusting the air supply to the internal combustion engine are actuated. In addition to the input variables described above, further control systems of the vehicle may be provided, which communicate selection variables, for example, a torque setpoint, to input circuit 14. These control systems may include, for example, traction controllers, vehicle dynamics controllers, transmission controls, engine anti-slip controls, etc. The air supply to the internal combustion engine, the firing angle of the individual cylinders, the fuel mass to be injected, the injection time, the air/fuel ratio, etc., are set via the control paths illustrated in FIG. 1. In addition to the setpoint selections illustrated in FIG. 1, the external setpoint selections, which also include a setpoint selection by the driver as a driving intent, internal selection variables for controlling the drive unit are provided, for example, a torque change of an idle speed controller, a speed limit, which outputs a corresponding setpoint selection variable, a speed change limit and/or torque change limit, limits for component protection, or a separate setpoint selection variable in the start.

Boundary conditions or characteristics representing the method of converting the setpoint selection variables are linked to the individual setpoint selection variables. Depending on the application, one or more characteristics may be linked to a setpoint selection variable, so that, in an exemplary embodiment according to the present invention, characteristics may relate to a characteristic vector, in which the various characteristic variables are entered. Characteristics of setpoint selection variables may include, for example, the required dynamic response during the setting of the setpoint selection variable, the priority of the setpoint selection variable, the size of the torque reserve to be set, and/or the comfort of the adjustment (e.g., change limit). However, more or less characteristics (or even one characteristic) may be provided.

A corresponding characteristic vector, which may include the characteristics described above, is communicated from the external control and/or regulation devices for the internal functions with every setpoint selection variable.

Figure 2:
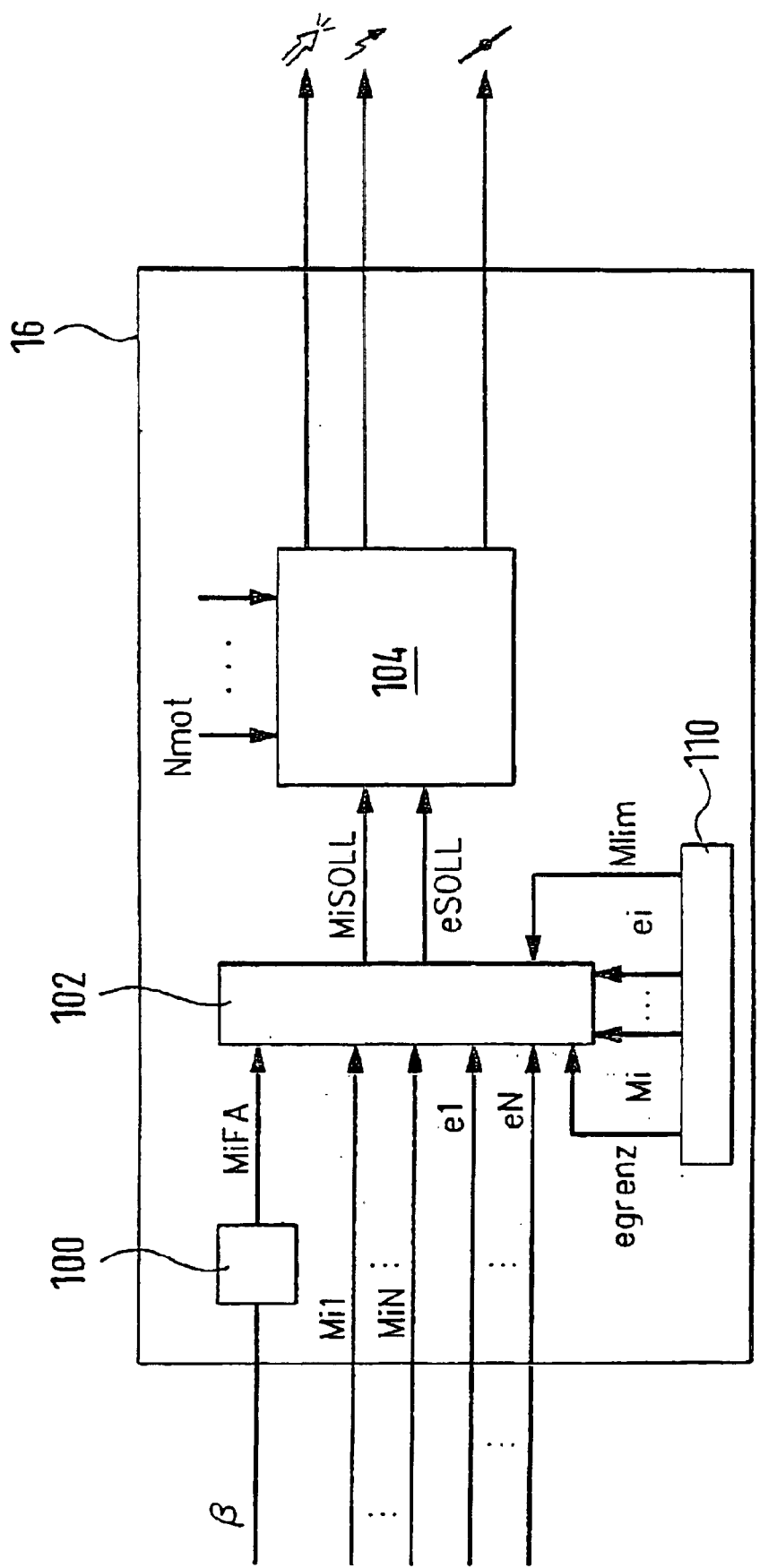
FIGS. 2 through 4 are block diagrams showing the coordination of existing setpoint selections, including characteristics, and the conversion of the resulting setpoint selections and characteristics by selection of available control paths.

FIG. 2 is a block diagram showing a program running in computer unit 16 of the control unit. FIG. 2 shows the coordination and conversion of the setpoint selections and their characteristics. Computer unit 16 is provided with a variable representing accelerator pedal setting β. The computer unit 16 converts this variable, possibly considering further operating variables, such as the engine speed, into a driver's intended torque MiFA in a calculation step 100, which is provided to coordinator 102. Furthermore, external torque setpoints Mi1 to MiN, which are also provided to coordinator 102, are communicated to computer unit 16. Selected characteristic variables (or characteristic vectors, which are composed of single characteristic variables) e1 to eN are communicated with each torque setpoint and provided to coordinator 102. In addition, internal functions 110 are provided, which either provide torque setpoints with the corresponding characteristic variables to coordinator 102 or specify limiting values Mlim for the torque setpoints and/or egrenz for the characteristic variables, which are also provided to coordinator 102 and are considered during the coordination of the setpoints and the characteristic values. The output of coordinator 102 is the resulting torque setpoint MiSOLL, which finally reaches the setting, and resulting characteristic variable(s) eSOLL, which is selected from the supplied characteristic variables in consideration of the limiting values, in whose framework the setpoint is implemented. These variables are provided to a converter 104, which is also provided further operating variables such as engine speed, etc. The converter converts torque setpoint MiSOLL into manipulated variables in consideration of the operating variables supplied and the resulting characteristic variable(s). Using these manipulated variables, the fuel metering, firing angle, air supply, etc., are influenced so that the selected torque setpoint is realized in the framework of the resulting characteristic(s).

Figure 3:
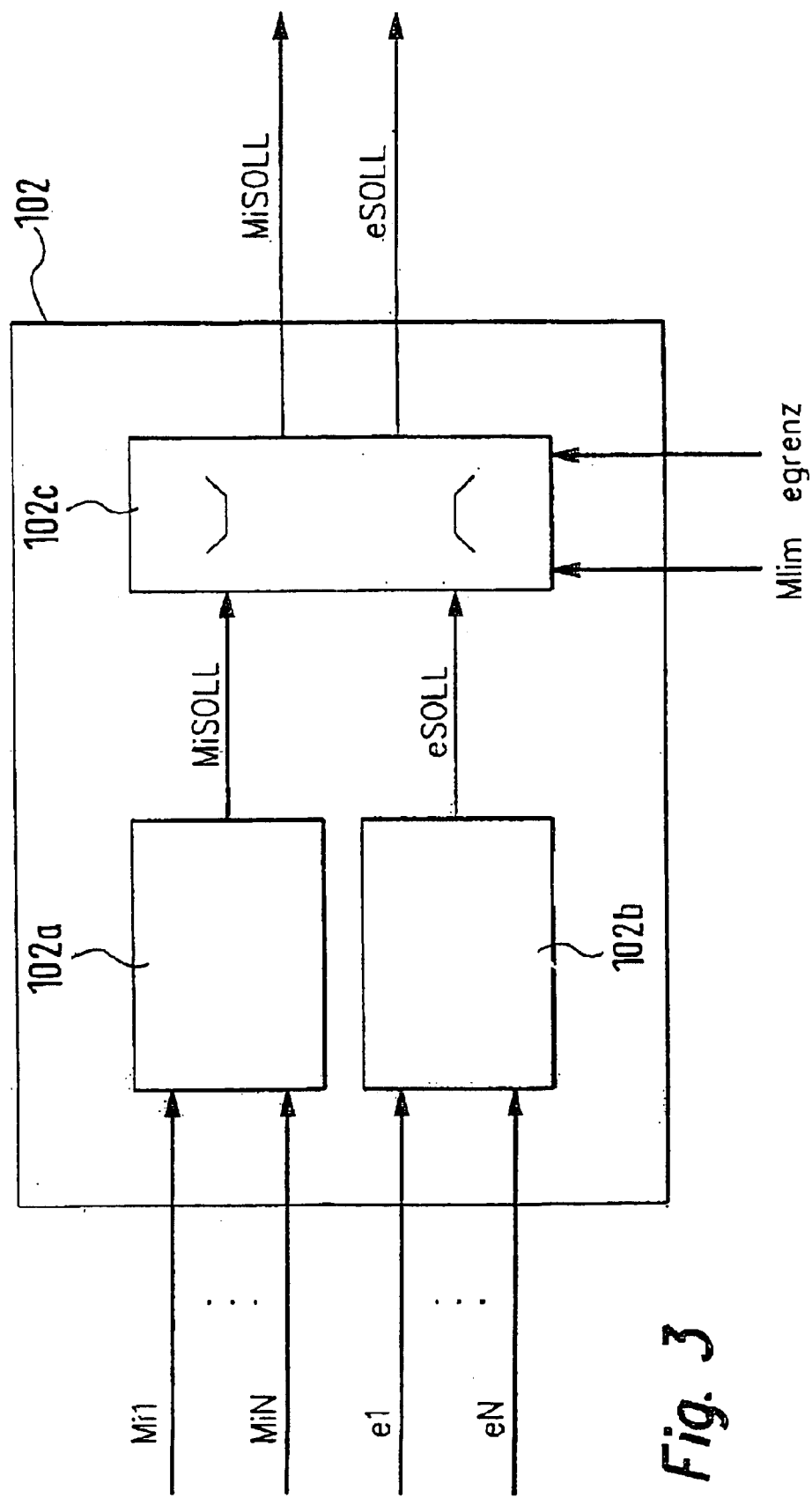

FIG. 3 is a block diagram illustrating an exemplary coordinator 102 according to the present invention. As described above, torque setpoints Mi1 to MiN, which also include the torque setpoints of the internal functions, are provided to the coordinator. Characteristic variables e1 to eN are assigned to these torque setpoints, including those for the internal setpoint selections. The torque setpoints are provided to torque coordinator 102a. Characteristic variables (vectors) e1 to eN are provided to and coordinated by characteristic coordinator 102b. The implementation of coordinator 102b depends on the characteristics used. The characteristic "priority" is selected by the coordinator in that the highest instantaneous priority is relayed to the converter. The characteristic "dynamic response" is selected in that the highest instantaneous dynamic response request is output to the converter as a characteristic. The same is true for the characteristic torque reserve. In this case, the greatest torque reserve to be set is relayed. The characteristic "comfort" may be selected, for example, depending on the driver type set (sportier driver, more comfortable driver, etc.), with a more comfortable or sportier implementation. The setpoint selections and selected characteristics are supplied by coordinators 102a and 102b to limiter 102c, which limits the setpoint selection to selected torque limiting values Milim, which may be formed, for example, for component protection reasons, exhaust reasons, etc. The communicated characteristic value(s) are limited to, limiting value egrenz. For example, this limiting value may represent the maximum possible dynamic response of the adjustment and/or the maximum possible size of the torque reserve in the present operating state. The characteristic limiting values may be either fixed or calculated in the framework of characteristics maps, calculations, etc. on the basis of the operating state, of operating variables, etc. Resulting values MiSOLL and eSOLL, which are communicated to the converter for setting and which may be limited, are then output by limiter 102c.

Torque setpoints and characteristic values are coordinated separately and independently from one another. Therefore, if a torque setpoint is selected by coordinator 102, its input characteristics may be changed, since another characteristic may be selected as significant by coordinator 102b. The characteristic values are thus changeable independently from the torque setpoints.

Figure 4:
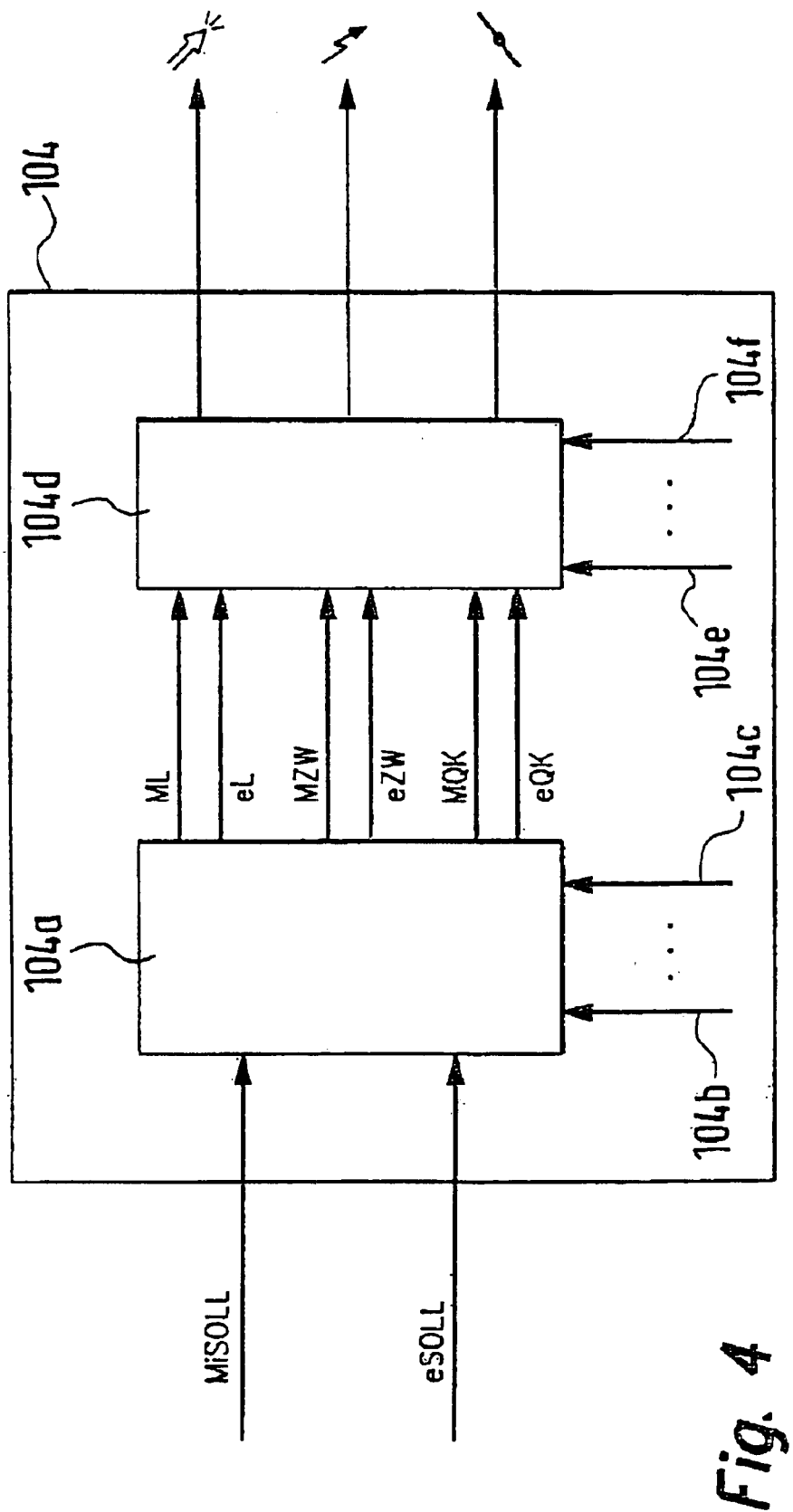

FIG. 4 shows a block diagram of an exemplary converter 104according to the present invention, which is provided with resulting values MiSOLL and eSOLL described above. First, the control paths are selected in 104a, possibly considering further operating variables, which may be supplied via lines 104b to 104c. This may be performed, for example, according to the characteristic to be implemented for each control path upon setting the setpoint and/or part of the setpoint. For example, in regard to the characteristic dynamic response, the minimum necessary time for achieving the setpoint is indicated in a table as a function of the instantaneous operating state, which may be determined, at least in part, by the speed, so that the suitable control path may be selected in consideration of the dynamic response request. The manipulated variables are thus generated with reference to the setpoints and characteristics transmitted and are functions of the mode of operation (in gasoline direct injection engines), speed, and/or further input variables. If, for example, there is homogeneous operation, the torque reserve is set as a firing angle adjustment, while it is not performed in the stratified operating mode. The information concerning the present operating mode is available to converter 104. A further example is the anti-bucking function, which requires the conversion of a torque request within a specific time, for example, 50 ms. At a lower speed, this is only possible via a firing angle adjustment and/or, in stratified operation, via a change in the fuel mass, since only these control paths provide the necessary dynamic response. At high speeds, the required change is also possible via the fuel quantity, even in homogeneous operation, because the dead angle in the fuel path results in dead times smaller than the necessary dynamic response. The converter thus establishes the torque to be set for each individual control path. In this case, the control paths air (ML), firing angle (MZW), and fuel (MQK) are illustrated in FIG. 4. Characteristics eL, eZW, eQK (e.g., the necessary dynamic response of the adjustment of the respective manipulated variable) characterizing the implementation of the manipulated variable are also transmitted with each manipulated variable. In an exemplary embodiment according to the present invention, the necessary dynamic response of the torque adjustment is transmitted as a characteristic variable. In this case, tables are provided to select the control path(s), in which the minimum adjustment times of the individual control paths for a specific torque change are listed as functions of the speed. For example, for a torque change of 50 Nm, at a speed of 2000 RPM, adjustment times of 67 microseconds for the air path, 33 microseconds for the fuel path, and 14 microseconds for the firing angle path result, while at 4000 RPM, the corresponding values are 27 microseconds, 13 microseconds, and 6 microseconds. Therefore, for a characteristic variable of 30 microseconds, the firing angle path is selected at a speed of 2000 RPM and the air path is selected at a speed of 4000 RPM. If the torque change may not be performed via only one path, a combination of the control paths is selected (e.g., a part of the torque change via firing angle, the remainder via fuel), corresponding characteristic variables for the respective control path being transmitted. After the torque change, in an exemplary embodiment according to the present invention, the firing angle is reset to its starting point and the air supply is appropriately adjusted. The other characteristics are implemented accordingly. In a further example, with $\lambda=1$ homogeneous operation, a reserve is achieved by increasing filling and adjusting the firing angle later. In stratified operation, either the selection of the reserve leads to an operating mode switch (reserve may not be achieved) or the required reserve results already in stratified operation due to the lambda limits.

The setpoint manipulated variables are then output in the actual converter 104*d* corresponding to the selection made, in consideration of operating variables, which are supplied via lines 104*e* to 104*f*, and in consideration of the communicated: characteristics in the adjustment signals for setting the fuel metering, the firing angle, and/or the air supply. In this case, the transmitted setpoint is converted into manipulated variables, while the method of changing the manipulated variable is determined by the characteristics. The efficiencies of the pre-controlled paths are also considered.

In addition to the manipulated variables described above, further manipulated variables, such as injection time, swirl damper setting, valve settings, etc. may be available, for example, in gasoline direct injection engines.

The procedure described above is not restricted to gasoline direct injection engine applications, but may also be applied to, for example, diesel internal combustion engines and/or alternative drives, such as electric motors, etc.

Furthermore, the procedure described above is not limited to the selection of only torque setpoints, but may also be used in connection with other output variables of the drive unit, such as power output, output speed, etc.

What is claimed is:

1. A method of controlling a drive unit of a vehicle, the method comprising:

setting at least one output variable of the drive unit as a function of a plurality of setpoint selection variables, a selected one of setpoint selection variables being used for the setting;

receiving a plurality of characteristic variables describing a manner by which the setpoint selection variables are set; and selecting at least one of the characteristic variables for controlling the drive unit independently of the setpoint selection variables.

2. The method of claim 1, wherein the setpoint selection variables include setpoints for a torque of the drive unit.

3. The method of claim 1, further comprising:

forming a plurality of manipulated variables for controlling the drive unit as a function of the at least one selected characteristic variable.

4. The method of claim 1, wherein the characteristic variables include at least one of a torque reserve setting variable, an adjustment dynamic response variable, a driving comfort variable, and a priority variable.

5. A device for controlling a drive unit of a vehicle, comprising:

a control unit including at least one computer unit, the computer unit including a selector arrangement;

wherein:

a plurality of setpoint selection variables for controlling the drive unit are communicated to the computer unit;

the selector arrangement is operable to select one of the setpoint selection variables and use it to control the drive unit;

the computer unit receives a plurality of characteristic variables describing a manner by which the setpoint selection variables are set; and the computer unit is operable to select at least one of the characteristic variables independently from the selection of the setpoint selection variable by the selector arrangement.

6. The device of claim 5, wherein the computer unit ascertains a plurality of manipulated variables for setting the selected one of the setpoint selection variables having at least one selected characteristic using the selected one of the setpoint selection variables and the at least one selected characteristic variable.

7. The device of claim 5, further comprising:

a converter to receive the selected one of the setpoint selection variables and the at least one selected characteristic variable, and to determine a plurality of manipulated variables for setting the selected one of the setpoint selection variables having the at least one selected characteristic variable using the selected one of the setpoint selection variables and the at least one selected characteristic variable.

8. The device of claim 6, wherein, in ascertaining the plurality of manipulated variables, the computer unit considers further operating variables including an operating state of the drive unit.

9. The device of claim 7, wherein, in determining the plurality of manipulated variables, the converter considers further operating variables including an operating state of the drive unit.

* * * * *